United States Patent
Mahieu et al.

(10) Patent No.: US 8,709,314 B2
(45) Date of Patent: Apr. 29, 2014

(54) METHOD FOR MANUFACTURING A TURBINE ENGINE VANE

(75) Inventors: Jean Noel Mahieu, Paris (FR); Jean-Louis Romero, Melun (FR)

(73) Assignee: SNECMA, Paris (FR)

( * ) Notice: Subject to any disclaimer, the term of this patent is extended or adjusted under 35 U.S.C. 154(b) by 119 days.

(21) Appl. No.: 13/140,596

(22) PCT Filed: Dec. 17, 2009

(86) PCT No.: PCT/FR2009/052596
§ 371 (c)(1), (2), (4) Date: Jun. 17, 2011

(87) PCT Pub. No.: WO2010/076513
PCT Pub. Date: Jul. 8, 2010

(65) Prior Publication Data
US 2011/0248416 A1  Oct. 13, 2011

(30) Foreign Application Priority Data
Dec. 18, 2008 (FR) ...................... 08 58763

(51) Int. Cl.
*B29C 70/24* (2006.01)

(52) U.S. Cl.
USPC ............. 264/40.1; 264/78; 264/136; 264/139

(58) Field of Classification Search
USPC .................... 264/40.1, 78, 136, 139
See application file for complete search history.

(56) References Cited

U.S. PATENT DOCUMENTS

| | | |
|---|---|---|
| 2003/0056847 A1 | 3/2003 | Schmidt et al. |
| 2007/0092379 A1 | 4/2007 | Coupe et al. |
| 2008/0099965 A1 | 5/2008 | Romero et al. |
| 2011/0089591 A1 * | 4/2011 | Gordon et al. ............... 264/40.1 |

FOREIGN PATENT DOCUMENTS

| | | |
|---|---|---|
| CN | 1951664 A | 4/1925 |
| CN | 1586432 A | 3/2005 |
| EP | 1 777 063 | 4/2007 |
| EP | 1 916 092 | 4/2008 |

OTHER PUBLICATIONS

International Search Report Issued Apr. 1, 2010 in PCT/FR09/052596 filed Dec. 17, 2009.
Chinese Office Action issued Mar. 27, 2013, in China Patent Application No. 2009801515638 (English Translation only).

* cited by examiner

*Primary Examiner* — Ryan Ochylski
(74) *Attorney, Agent, or Firm* — Oblon, Spivak, McClelland, Maier & Neustadt, L.L.P.

(57) ABSTRACT

Fabricating a blade by 3D weaving a preform that is to be impregnated with resin. The visibility of the cut ends of certain yarns of the preform, e.g. the warp yarns, is accentuated in order to cause curved lines to appear, and the configuration of these curved lines is compared with a reference configuration in order to shape the preform properly.

11 Claims, 2 Drawing Sheets

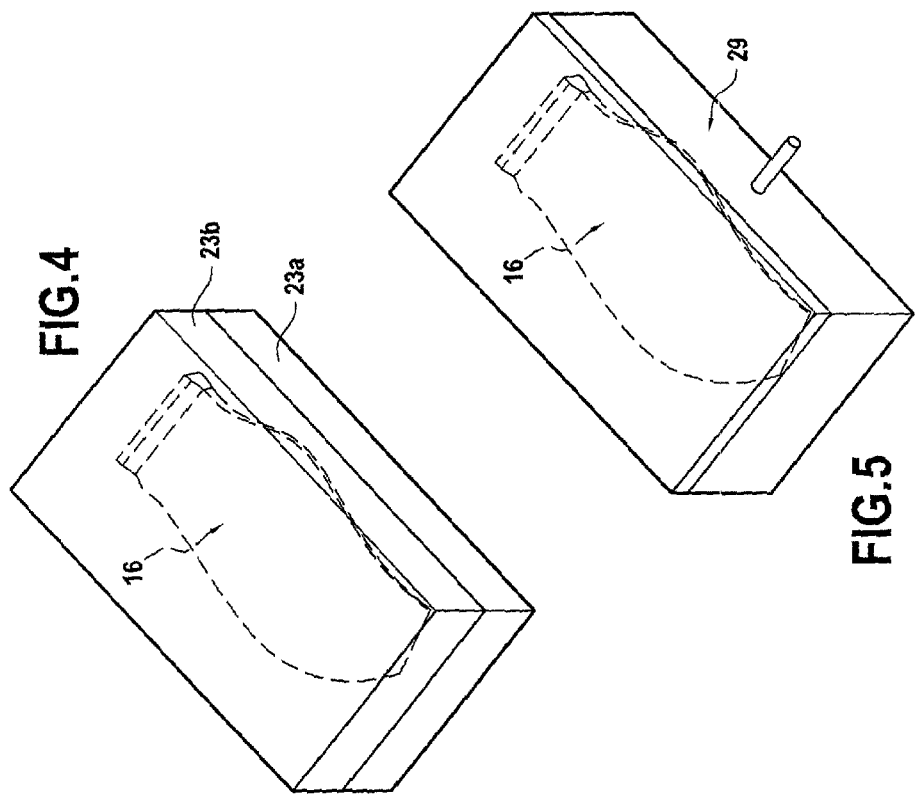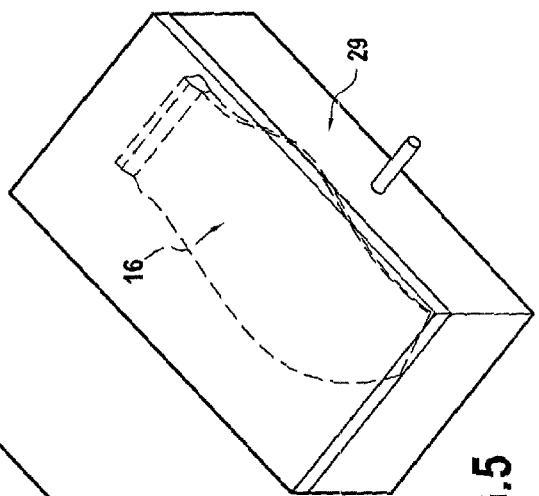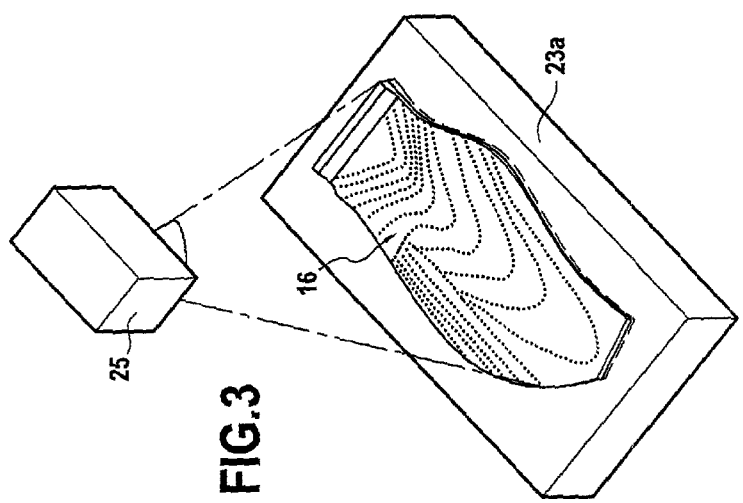

METHOD FOR MANUFACTURING A TURBINE ENGINE VANE

The invention relates to a method of fabricating a turbomachine blade by three-dimensional (3D) weaving, and more particularly but not exclusively a blade of large size, e.g. for an airplane turbojet fan. The invention relates more particularly to an improvement enabling the performance of certain steps of the method to be better inspected so that the final characteristics of the blade are as close as possible to those of a reference blade that is deemed to be optimum.

Document EP 1 777 063 describes a method of fabricating a blade that is obtained from a preform obtained by 3D weaving of warp yarns and of weft yarns. Typically, the yarns are made of carbon fibers. The preform obtained in that way is then shaped by being positioned in a suitable mold prior to being compacted and stiffened. Finally, the preform as prepared in this way is placed in a stove-forming heating mold into which a thermosetting resin is injected. The blade in the raw state as extracted from the mold has practically the same shape and dimensions as the final product is intended to have, and it therefore requires only a minimum amount of reworking by machining.

In the fabrication of the preform or blank, an actual loom is used that serves to determine the outline and the thickness of all of the points of said preform. Typically, in a loom of this kind, the warp yarns occupy 32 layers, each layer being made up of several hundred yarns. The warp yarns may also be referred to as strands in the art in question. By means of the loom, it is possible to position all of these warp yarns individually on either side of the direction in which weft yarns are passed, thereby enabling the weaving to be fully determined concerning the outline of the preform, its texture, and its thickness, at all points. With this technique, even the root of the blade may be formed integrally with its airfoil.

In order to give the preform its dimensional characteristics, certain yarns stop being woven from a certain stage. They are then cut at the locations where they leave the woven mass. As a result, said cut ends define curved lines that are sketched in dotted form. This applies particularly to the cut ends of the warp yarns.

The invention stems from observations resulting from a large number of tests seeking to define the optimum characteristics for a blade, i.e. a blade that presents a maximum amount of strength against the types of impact to which such a blade is likely to be subjected throughout the time it is in use. For each type of blade, it has been possible to find a reliable match between the strength of the blade and the configuration of the curved lines. Following successive tests, this has made it possible to define an ideal weaving configuration represented by an optimum configuration for all of the curved lines (i.e. the precise locations for all of the points where the yarns are cut) such that the resulting blade, providing it has this configuration, can be considered as having the highest performance.

According to the invention, throughout the fabrication of such a blade, care is taken to refer to this configuration of reference curved lines and to ensure or to verify that the configuration of the blade is and remains as close as possible to the corresponding configuration of the optimum blade as previously determined and stored in one form or another.

More precisely, the invention thus provides a method of fabricating a blade by 3D weaving a preform in which warp yarns and weft yarns are cut at predetermined locations in order to define the outlines and the volume of said preform, said preform is shaped, and said shaped preform is impregnated, the method being characterized by the steps consisting in:
ensuring that the cut ends of at least some yarns are visible so as to make curved lines appear;
at least comparing the configuration of these curved lines with a reference configuration; and
using the result of this comparison for preparing the blade.

The warp yarns and the weft yarns are preferably based on carbon fibers. At least some of the yarns, and preferably the warp yarns, are surrounded in a covering of sizing.

This active or passive inspection process may be applied at various stages in the fabrication of the blade, and in particular while it is being shaped which may comprise shaping proper followed by compacting.

Thus, after the preform has been woven, the warp and weft yarns are cut in order to extract the preform from the loom. This produces a relatively malleable mass that needs to be shaped and then compacted, while giving it a certain amount of stiffness prior to proceeding with impregnation of the resin that will give it its almost final shape and dimensions and also its exceptional ability to withstand impacts. The principle of the invention as defined above may be applied successively at several of these stages.

Thus, in general, during shaping, action is taken on the preform to cause its curved lines to coincide substantially with the curved lines of such a reference configuration. It is thus possible to envisage acting in this way on the preform at several stages prior to the impregnation stage, but naturally, action is taken mainly while the blade is being shaped immediately after being woven. The possibility of referring to a configuration of curved lines that is visible (or at least detectable) makes it possible to adapt the way the preform is positioned in its shaping template (e.g. a portion of a compacting mold), and to act on the still malleable tangle of yarns in order to ensure that the curved lines are indeed given a configuration that is as close as possible to the predetermined optimum configuration (such inspection may be said to be "active").

It is also possible to perform an inspection later, after compacting.

In other words, the method may also be characterized in that after shaping, said preform may be compacted and it may be verified that its curved lines coincide substantially with the curved lines of a corresponding reference configuration. This verification or inspection serves to ensure that compacting has not modified the optimum configuration of the curved lines, representative both of the weaving and of the optimum shaping of the preform. If the verification is not good, it is possible either to repeat the compacting step in order to obtain an acceptable configuration of the curved lines, or else to reject the blank, when obtaining an acceptable configuration is not possible.

Thereafter, it is possible to perform a final inspection of the same type after impregnation.

In other words, after a blade that is being fabricated has been impregnated, it is selected providing its curved lines coincide substantially with the curved lines of a corresponding reference configuration.

As mentioned above, the method is preferably applied by identifying the cut ends of warp yarns, e.g. by accentuating their visibility. Nevertheless, the method may also be applied by accentuating the visibility of the cut ends of the weft yarns.

In one possible implementation, the cut ends of the warp yarns or of the weft yarns may be colored (by being marked with a drop of pigment). It is possible to envisage combining both types of identification by selecting different colors.

In another possibility, it is possible to color sizing that covers at least some of the yarns in order to accentuate the visibility of their cut ends. Sizing is the covering of the yarns that, by melting under the effect of heat during the compacting operation, enables the yarns to be bonded to one another, and thus enables a structure to be obtained that presents a certain amount of stiffness, while nevertheless not opposing subsequent impregnation.

By way of example, an above-mentioned comparison step is performed by placing a configuration of reference curved lines that are marked on a transparent medium on the preform or blank.

It should be observed that said optimum configuration may differ a little from one step to another, and that that difference may involve using a plurality of transparent media that are different.

In yet another variant, an above-mentioned comparison step may be performed by optically imaging said curved lines of the preform or blank, by creating a computer file from the image, and by comparing it with a corresponding reference computer file.

Once more, there may be a plurality of reference files corresponding to different inspection steps.

The invention can be better understood and other advantages thereof appear more clearly in the light of the following description of an example of the method in accordance with the principle of the invention for fabricating a blade by 3D weaving, the description being given purely by way of example and being made with reference to the accompanying drawings, in which:

FIG. 3 is a diagrammatic view showing the actual shaping of said preform after weaving;

FIG. 4 is a diagrammatic view showing compacting; and

FIG. 5 is a diagrammatic view showing impregnation.

Figure 1:
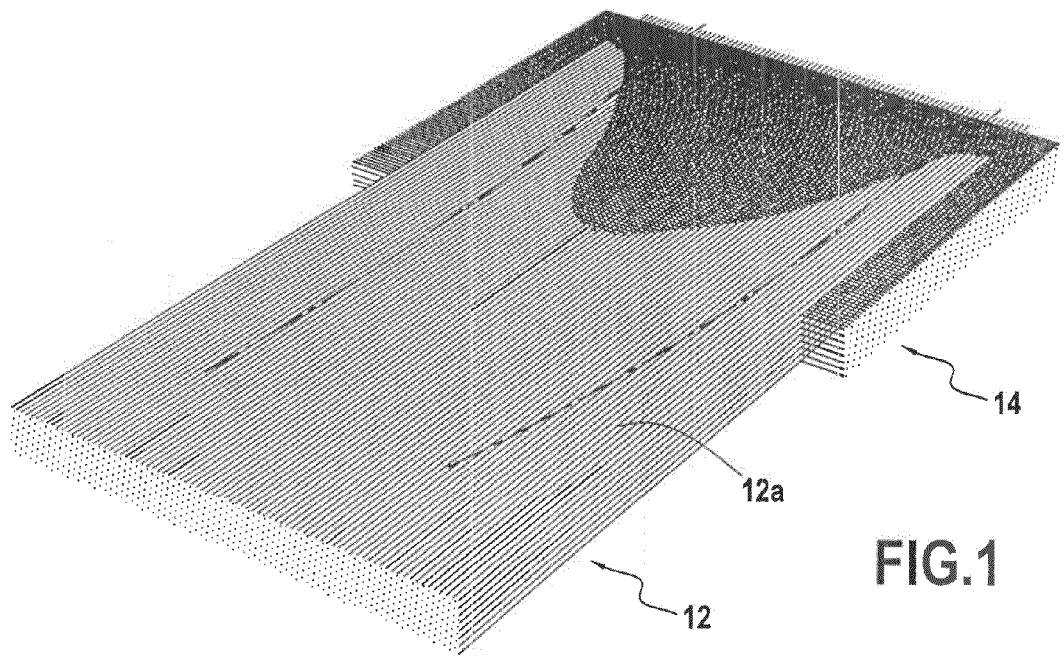
FIG. 1 is a diagrammatic view showing 3D weaving of a preform.

FIG. 1 shows the weaving proper of the blade using a jacquard type loom having a bundle 12 of warp yarns or strands placed thereon, e.g. comprising 32 layers, each having several hundred yarns. The mechanism is such that it is possible to act on each of these yarns transversely to the sheets of warp yarns as shown, in order to insert weft yarns 14. While weaving the root of the blade, which is its thickest portion, all 32 layers are involved in the weaving, and then progressively, as the weaving of the blade continues with thickness that decreases, some number of warp yarns 12a are no longer involved in the weaving, thus making it possible to obtain a preform with desired and continuously variable thickness and outline. At the end of weaving, the preform 16 appears to be held in the middle of a tangle of two series of yarns: warp yarns and weft yarns. These warp and weft yarns are then cut at the boundaries of the woven mass.

Figure 2:
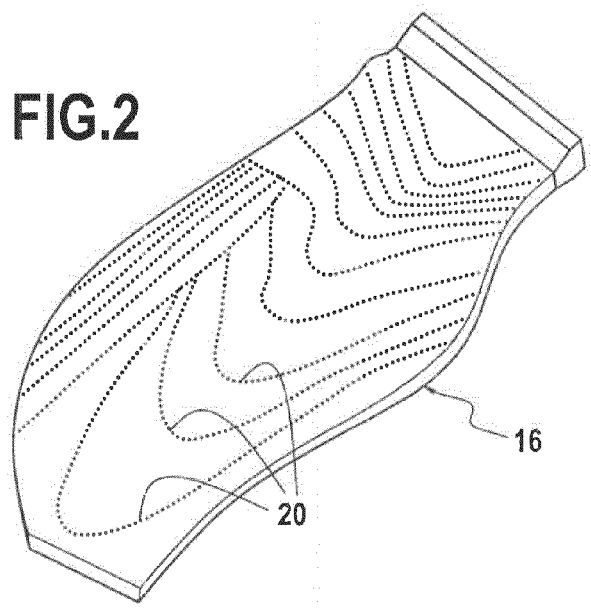
FIG. 2 is a diagrammatic view of a woven preform.

This produces a preform 16 as shown in FIG. 2.

According to an important characteristic of the invention, the visibility of the cut ends 18 of at least some of the yarns, e.g. here only of the warp yarns, is accentuated so as to reveal curved lines 20 in the form of dots on the surface of the preform. As mentioned above, each cut end may be colored by a dot of pigment. In another possibility, if the yarns are previously covered in a covering of sizing material having a desired color, then the mere fact of cutting the yarn will reveal its end having a color that is different, i.e. the color of the carbon fiber.

In any event, the preform 16 is remarkable in that the cut ends of the warp yarns appear very visibly as dots, by virtue of the color contrast.

The method continues with the preform 16 while still malleable (because it comprises no more than a mass of yarns interlocked by weaving) being placed in a shaper mold 23a, e.g. constituted by the bottom portion of a shaping mold 23a, 23b.

At this step, it is possible to project onto the preform (by means of a projector 25) the image of the curved lines of a predetermined ideal preform. The operator can thus adjust the placing of the preform in the shaping mold 23a so as to cause the pigmented lines of the preform to coincide with the projected lines. This result is shown in FIG. 3.

In a variant, it is possible on the contrary to take an optical image of the preform 16 in the shaping mold, to convert the image and in particular the image of the curved lines 20 into a computer file, and to compare the content of the file with the content of a reference file representative of the curved lines of the reference blade.

The following step, as shown in FIG. 4, is itself conventional. It comprises performing compacting and initial stiffening of the preform 16. The top portion 23b of the compacting mold is put into place. The mold is closed under pressure while heating so as to perform compacting while melting the sizing covering the yarns, thus enabling a preform to be obtained that presents a certain amount of stiffness. At the end of the compacting, it is possible to perform the inspection operation once more by projecting a configuration of curved lines of an ideal preform (as considered at this stage of fabrication) once more in order, at least, to verify that the proper positioning of the preform has not suffered as a result of the compacting operation.

The following operation is shown in FIG. 5; it consists in impregnating the preform 16 with resin. This operation is likewise conventional; the compacted blade is placed in a mold 29 forming a stove for having thermosetting resin injected therein.

At the end of this impregnation operation, the curved lines are still visible at the surface of the impregnated preform and it is possible once more to perform an inspection operation to ensure that impregnation has not significantly modified the configuration of said curved lines.

At the end of this inspection, providing it is successful, the preform is selected and is subjected to machining to give it its final shape. If the inspection is unsuccessful, then the impregnated preform is discarded.

As mentioned above, the inspection operation that may be repeated at several stages in the method may also be performed using at least one transparent medium having marked thereon reference curved lines that correspond to the curved lines of an optimum blade.

The invention claimed is:

1. A method of fabricating a blade by 3D weaving a preform in which warp yarns and weft yarns are cut at predetermined locations in order to define outlines and a volume of said preform, said preform is shaped, and said shaped preform is impregnated, the method comprising:
    ensuring that cut ends of at least some yarns are visible so as to make curved lines appear;
    comparing a configuration of the curved lines of said preform with a reference configuration; and
    using the result of the comparing the configurations for preparing the blade.

2. A method according to claim 1, wherein action is taken on said preform to ensure that curved lines of said preform coincide substantially with curved lines of the reference configuration, prior to the impregnation stage.

3. A method according to claim 1, wherein said preform after weaving is shaped and it is verified whether the curved lines of said preform coincide substantially with the curved lines of the reference configuration.

4. A method according to claim 3, wherein said preform is compacted after said preform has been shaped, and it is verified whether the curved lines of said preform coincide substantially with the curved lines of the reference configuration.

5. A method according to claim 1, wherein, after impregnation, a blade that is being fabricated is selected provided that the curved lines of said preform of said blade coincide substantially with the curved lines of the reference configuration.

6. A method according to claim 1, further comprising accentuating visibility of at least the cut ends of the warp yarns.

7. A method according to claim 6, further comprising coloring a sizing covering of at least some of the yarns in order to accentuate visibility of the cut ends thereof.

8. A method according to claim 1, further comprising coloring the cut ends of the warp yarns.

9. A method according to claim 1, further comprising coloring the cut ends of the weft yarns.

10. A method according to claim 1, wherein said comparing the configurations is performed by optically imaging said curved lines of the preform, by creating a computer file from said image, and by comparing the created computer file with a corresponding reference computer file.

11. A method according to claim 1, wherein said comparing the configurations is performed by superposing a configuration of reference curved lines marked on a transparent medium onto said preform.

* * * * *